US007398113B2

(12) United States Patent
Kozakai et al.

(10) Patent No.: US 7,398,113 B2
(45) Date of Patent: Jul. 8, 2008

(54) PORTABLE WIRELESS APPARATUS

(75) Inventors: Osamu Kozakai, Kanagawa (JP); Yuichiro Saito, Tokyo (JP); Noboru Ono, Tokyo (JP)

(73) Assignee: Sony Ericsson Mobil Communications Japan, Inc., Tokyo (JP)

( * ) Notice: Subject to any disclaimer, the term of this patent is extended or adjusted under 35 U.S.C. 154(b) by 357 days.

(21) Appl. No.: 10/772,379

(22) Filed: Feb. 6, 2004

(65) Prior Publication Data

US 2004/0214620 A1 Oct. 28, 2004

(30) Foreign Application Priority Data

Feb. 7, 2003 (JP) ............................ 2003-030942

(51) Int. Cl.
*H04M 1/00* (2006.01)
*H01Q 9/16* (2006.01)
*H01Q 9/44* (2006.01)
*H01Q 1/24* (2006.01)

(52) U.S. Cl. .................... 455/575.7; 343/792; 343/702; 343/700 MS

(58) Field of Classification Search .............. 455/575.5, 455/575.7; 343/700 MS, 702, 841, 792
See application file for complete search history.

(56) References Cited

U.S. PATENT DOCUMENTS 4,701,763 A * 10/1987 Yamamoto et al. .... 343/700 MS
5,440,317 A * 8/1995 Jalloul et al. ................ 343/791
5,781,158 A * 7/1998 Ko et al. ............... 343/700 MS
6,281,851 B1 * 8/2001 Tay et al. .................... 343/702
6,906,677 B2 * 6/2005 Yamamoto et al. .......... 343/789
2002/0024474 A1 * 2/2002 Chen .......................... 343/792
2003/0058177 A1 * 3/2003 Nishikido et al. ........... 343/702

FOREIGN PATENT DOCUMENTS

| | | |
|---|---|---|
| JP | 61-284102 | 12/1986 |
| JP | 6-260826 | 9/1994 |
| JP | 11-205179 | 7/1999 |
| JP | 2000-101333 | 4/2000 |
| JP | 2000-252731 | 9/2000 |
| JP | 2001-156898 | 6/2001 |
| JP | 2001-257522 | 9/2001 |

* cited by examiner

*Primary Examiner*—George Eng
*Assistant Examiner*—Matthew C Sams
(74) *Attorney, Agent, or Firm*—Oblon, Spivak, McClelland, Maier & Neustadt, P.C.

(57) ABSTRACT

A thinner portable wireless telephone with a thinner built-in antenna. An antenna unit is composed of a first radiating conductor and a second radiating conductor. The second radiating conductor having about half electrical length of the first radiating conductor is arranged so as to correspond the first radiating conductor from its center to one end in parallel. In addition, one ends of the first and second radiating conductors are electrically connected and power is supplied to around the center of the first radiating conductor and the other end of the second radiating conductor. Only electric current flowing on the external surfaces of the antenna unit causes radio waves. As a result, the space between the first and second radiating conductors can be narrowed, thus making it possible to construct a thinner antenna unit. Thus a portable wireless apparatus can be made thinner.

3 Claims, 9 Drawing Sheets

PORTABLE WIRELESS APPARATUS

BACKGROUND OF THE INVENTION

1. Field of the Invention

This invention relates to a portable wireless apparatus, and more particularly, is suitably applied to a portable telephone.

2. Description of the Related Art

In recent years, telescopic whip antennae 21 and built-in inverted-F antennae 22 as shown in FIG. 1 are widely used as antennae of portable telephones. The inverted-F antenna 22 is constructed by arranging a radiating conductor 22A on the ground plane in parallel. Since some space is necessary between the radiating conductor and the ground plane for good antenna performance, it is difficult to make the portable telephone with the inverted-F antenna thinner. In order to realize a thinner antenna unit, such an antenna unit has been proposed that two conductors serving as antenna elements for feeding are installed in respective upper and lower cases of a clamshell portable telephone (refer to Japanese Patent Laid Open 2001-156898).

Such antenna units, however, are difficult to use for stick portable telephones because the two conductors have to be electrically separated.

SUMMARY OF THE INVENTION

In view of the foregoing, an object of this invention is to provide a portable wireless apparatus comprising: a first radiating conductor; a second radiating conductor having about half electrical length of the first radiating conductor and provided so as to correspond the first radiating conductor from its center to its one end in parallel with leaving prescribed space; a connector electrically connecting the one end of the first radiating conductor and one end of the second radiating conductor facing the one end of the first radiating conductor; and a power feeder for feeding power to a vicinity of the center of the first radiating conductor and the other end of the second radiating conductor.

The electrical length of the second radiating conductor is set to about ¼ wavelength of a frequency used for the portable wireless apparatus. Since only electric current flowing on the external surfaces of the antenna unit composed of the first and second radiating conductors causes radio waves, the space between the first and second radiating conductors can be narrowed, thus realizing a thinner portable wireless apparatus.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Preferred embodiments of this invention will be described with reference to the accompanying drawings:

(1) Entire Construction of Portable Telephone

Figure 1:
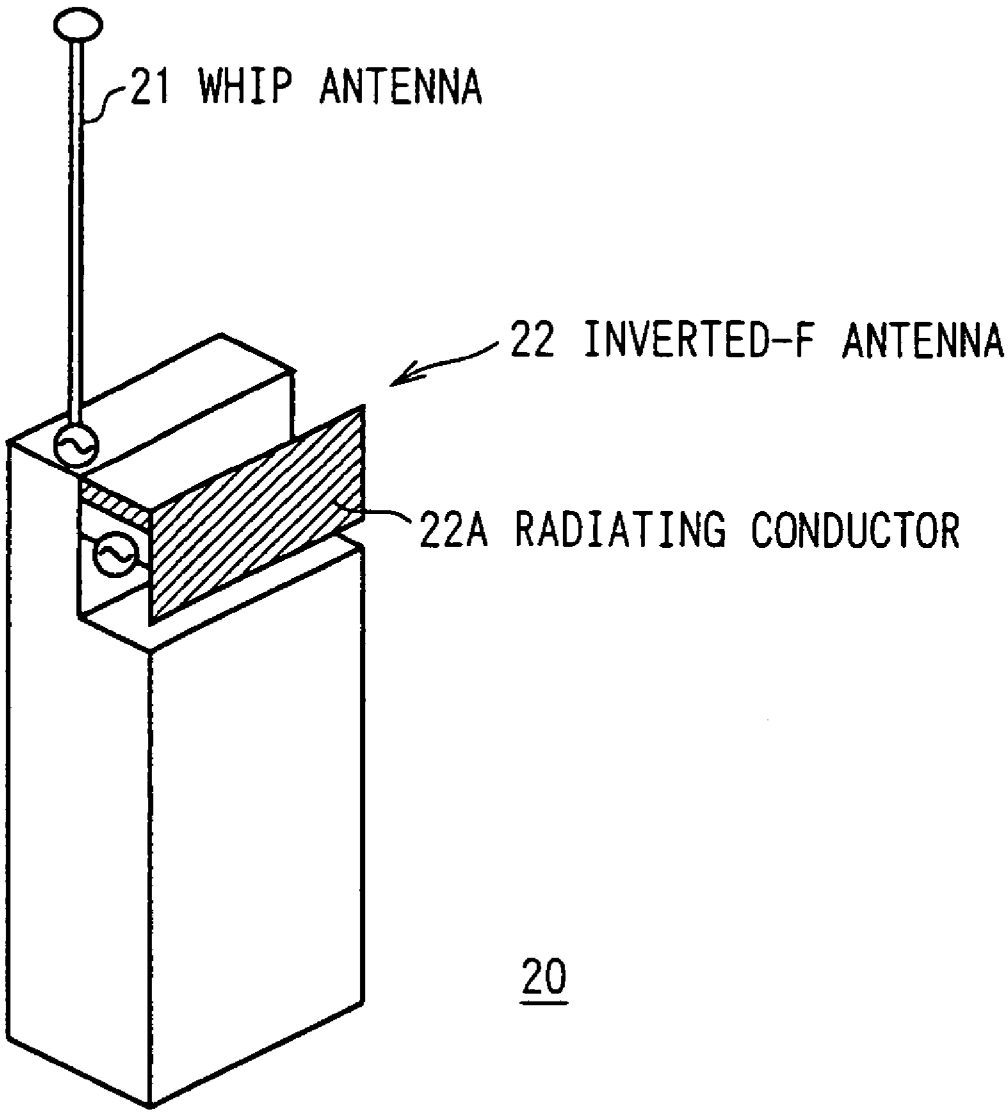
FIG.1 (RELATED ART)
FIG. 1 schematically shows a conventional portable telephone.
Figure 2:
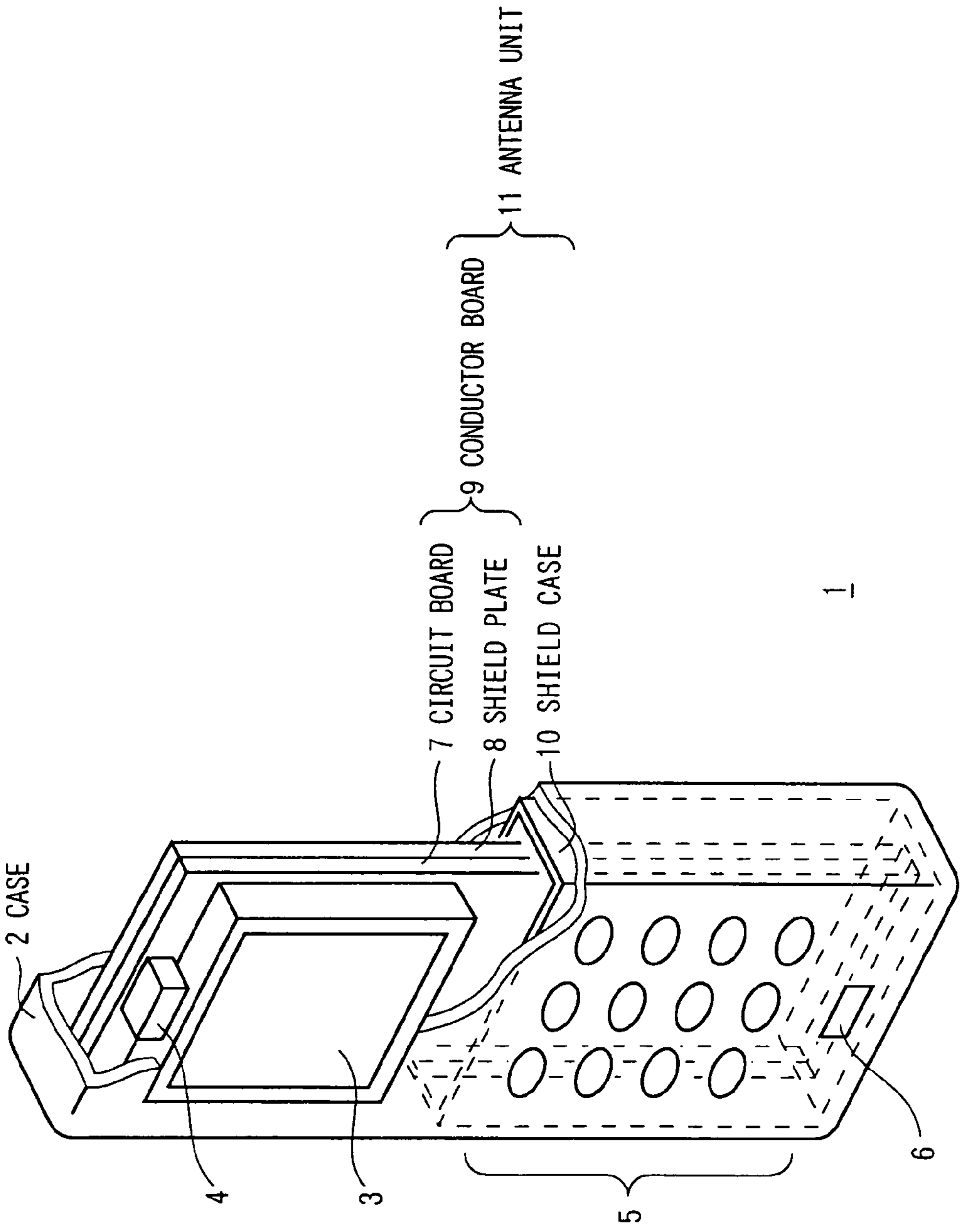
FIG. 2 schematically shows a portable telephone of the present invention.

In FIG. 2, reference numeral 1 shows a stick portable telephone as a portable wireless apparatus of this invention. As shown in this figure, arranged on this portable telephone 1 are a display 3 comprising a liquid crystal display or the like, a loudspeaker 4, a keypad 5 composed of plural buttons, and a microphone 6. In addition, the portable telephone 1 contains a circuit board 7 provided with electronic components for the display 3 and loudspeaker 4. A metal shield plate having a shape almost the same as the circuit board 7 is stuck on the back of this board 7. The circuit board 7 and shield plate 8 are little smaller than the case 2 of this portable telephone 1 and are supported by a supporting member (not shown) so as not to touch the inside of the case 2

(2) Antenna Unit

The ground of the circuit board 7 and the shield plate 8 are electrically connected to each other. Therefore, the shield plate 8, the circuit board 7 and the electronic components on this board 7 electrically compose a single conductor board 9. The lower half of the inner surface of the case 2 is coated with metal so as to form a shield case 10. This conductor board 9 and the shield case 10 function as a built-in antenna unit 11.

Figure 3:
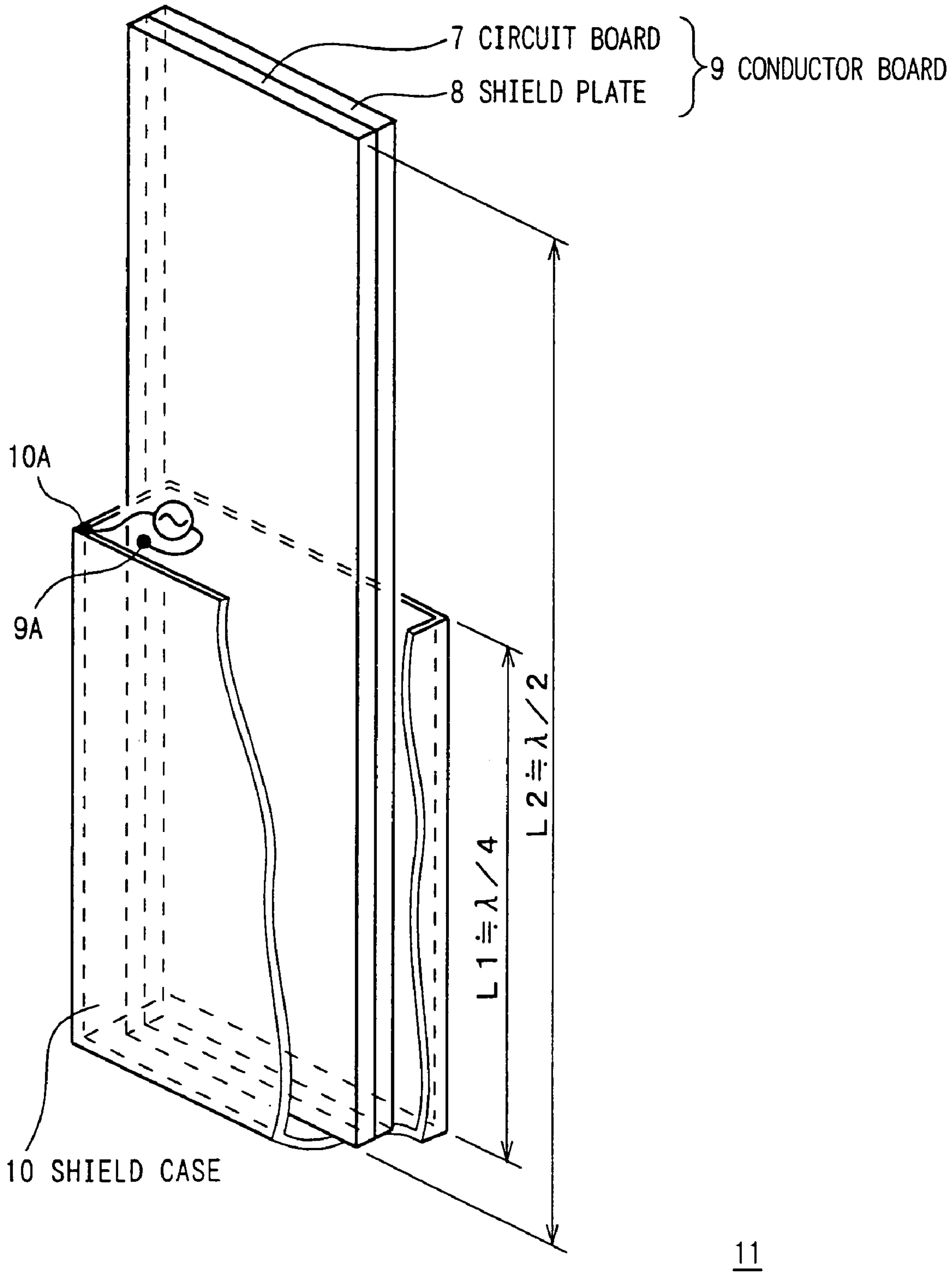
FIG. 3 schematically shows an antenna unit.

As shown in FIG. 3, the shield case 10 as a second radiating conductor contains the lower half of the conductor board 9 as a first radiating conductor in parallel. The length "L1" of the shield case 10 is selected to a half of the length "L2" of the conductor board 9.

The bottom end of the conductor board 9 is electrically connected to the bottom surface of the shield case 10. Power is supplied from a feeding circuit of the circuit board 7 to a feeding point 9A provided at the center of the edge of the conductor board 9 and a feeding point 10A provided at an upper edge corner of the shield case 10 close to the feeding point 9A.

Figure 4:
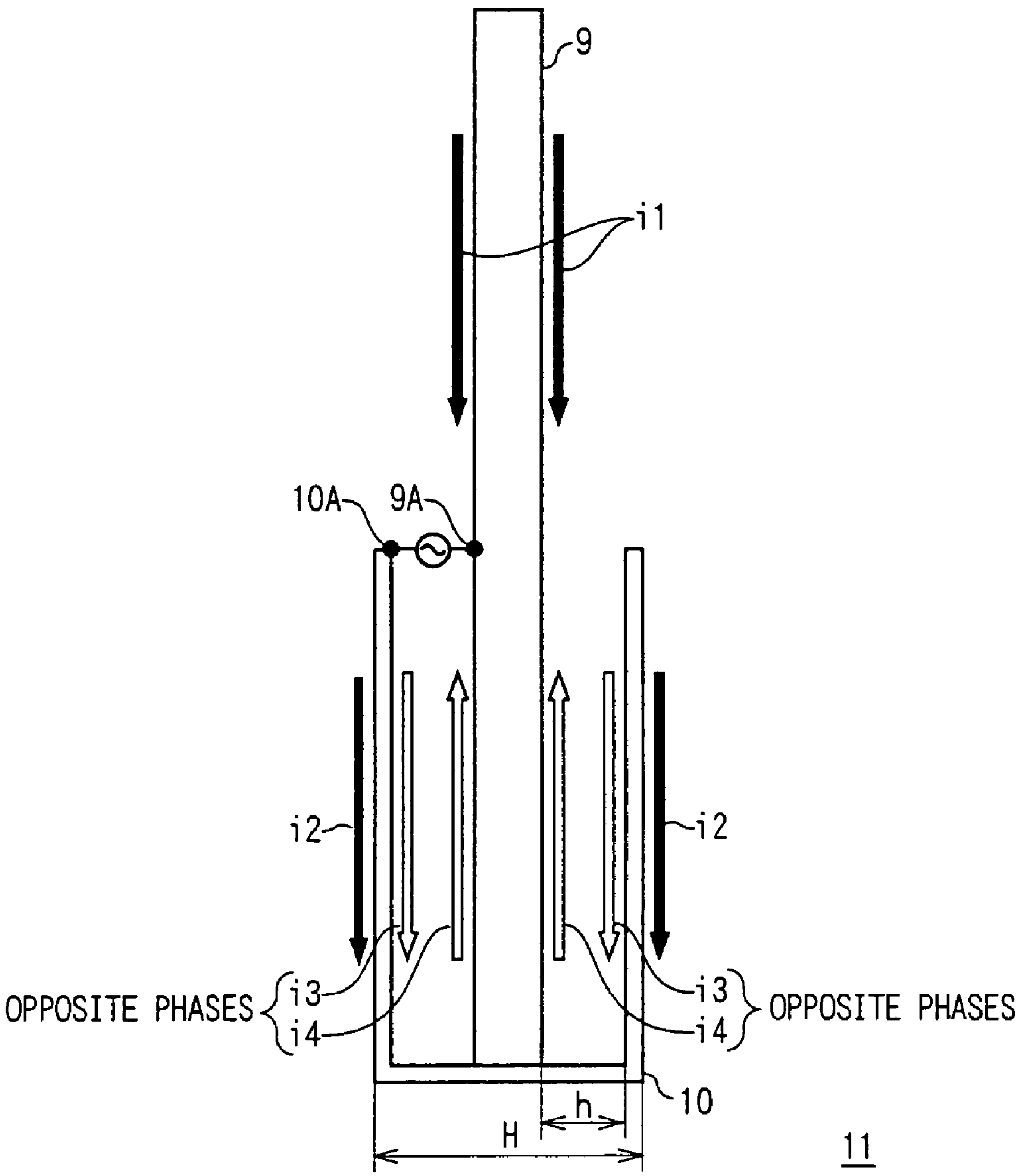
FIG. 4 shows electric current flowing on the antenna unit.
Figure 5:
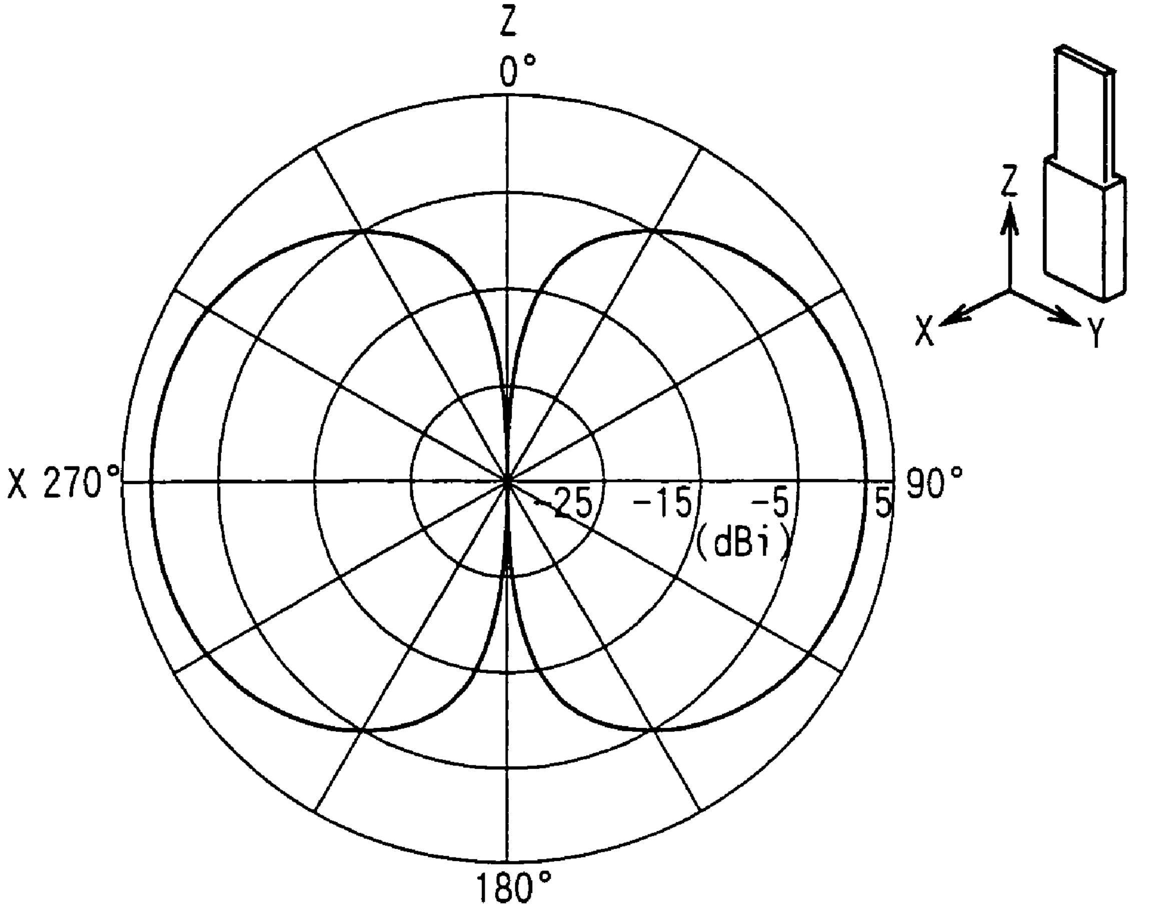
FIG. 5 shows a radiation pattern of the antenna unit.

FIG. 4 is a cross-sectional view of the antenna unit 11. High-frequency electric current supplied to the feeding points 9A and 10A mainly flow on the surfaces of the antenna unit 11 as indicated by arrows i1 to i4. The electric current i3 on the inner surface of the shield case 10 and the electric current i4 on the lower half of the conductor board 9 have opposite phases, resulting in offsetting the electric currents and no emission of radio waves. The electric current i1 and the electric current i2 on the external surfaces of the antenna unit 11 have the same phases, resulting in enhancing the electric currents and emission of radio waves from the entire external surfaces of the antenna unit 11. Therefore, this antenna unit 11 has a good symmetric radiation pattern similar to that of a half-wave dipole antenna in a vertical plane as shown in FIG. 5.

Figure 6:
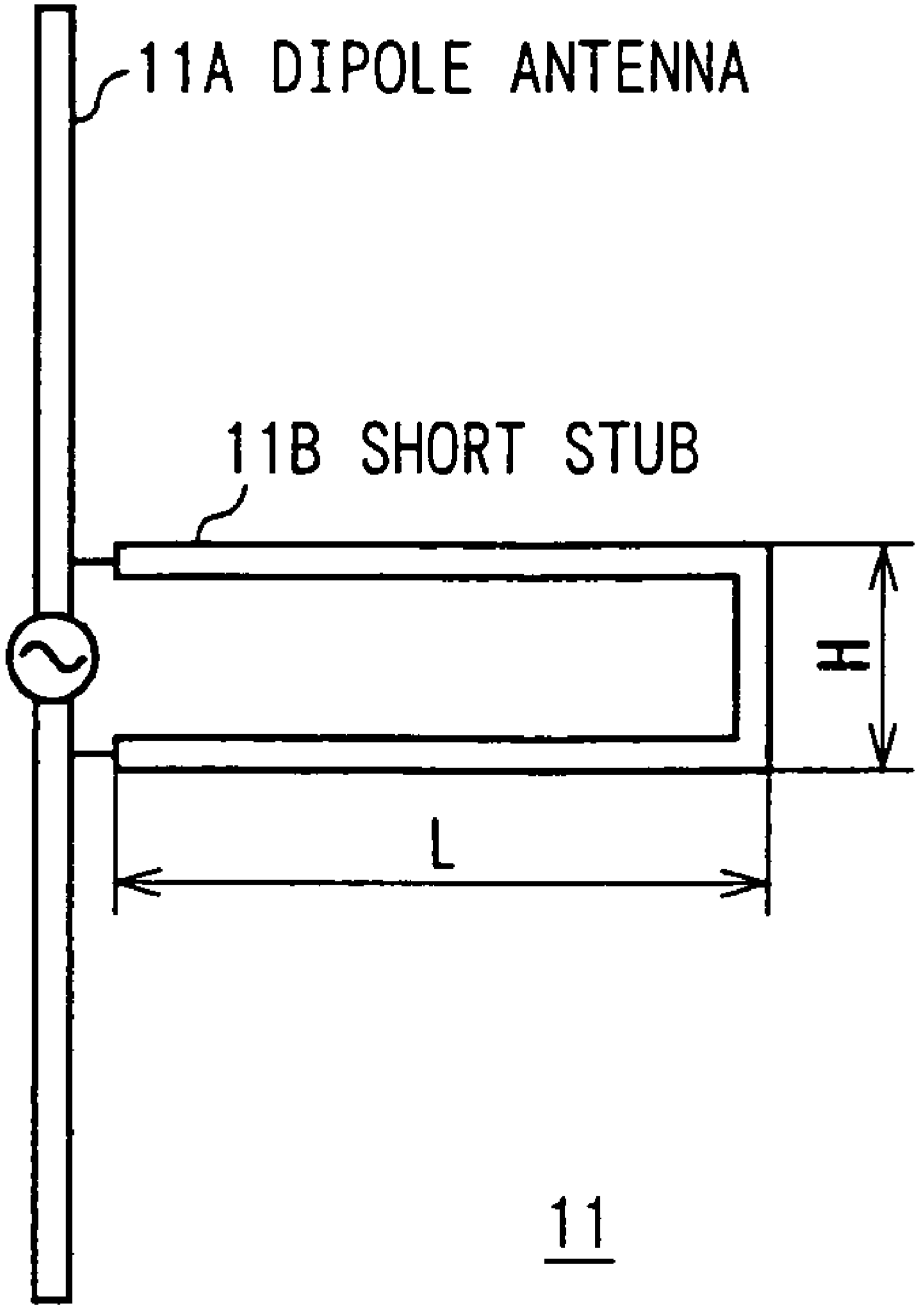
FIG. 6 schematically shows the antenna unit as viewed from a feeding circuit.

As viewed from the feeding circuit, the antenna unit 11 corresponds to a dipole antenna 11A with a short stub 11B (actually, shield case 10) of a length L and a width H as shown in FIG. 6. A low impedance of the short stub 11B deteriorates an input impedance of the antenna unit 11, resulting in difficult matching with the feeding circuit. Therefore, the impedance of the short stub 11B should be made high to a certain extent.

Figure 7:
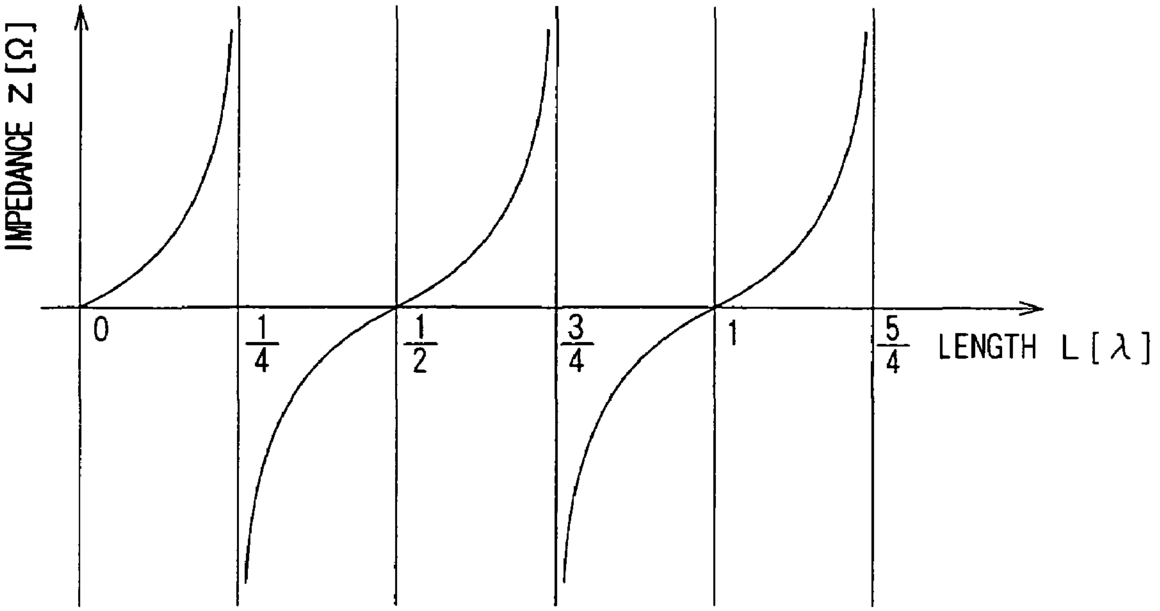
FIG. 7 is a curve graph representing impedance of a short stub.

FIG. 7 shows impedance Z of the short stub 11B with respect to its length L. The impedance Z has maximal values at λ/4, 3λ/4, 5λ/4, . . . that is, L=λ/4nλ/2 (λ indicates a wavelength and n is an integral number). Selecting λ/4 as an electrical length of the short stub 11B increases the impedance of the short stub 11B and sets the input impedance of the antenna unit 11 to an appropriate value. Therefore, as shown in FIG. 3, the antenna unit 11 has the shield case 10 of length (electrical length) L1=λ/4 and the conductor board 9 of length L2=λ/2.

Although the short stub impedance increases with widening the short stub 11B, the maximal values can be obtained with the same lengths L, regardless of the width H. Therefore, the space between the conductor board 9 and the shield case 10 can be made narrower, provided that the shield case 10 has an appropriate length L1. As a result, unlike one-side short-circuit antennae such as inverted-F antennae, the portable telephone 1 can be made thinner.

(3) Other Embodiments

In the preferred embodiment described above, the shield case 10 is made by coating the lower half of the inside of the case 2 with metal. This invention, however, is not limited to this and a shield case can be made by coating the outside surface of the case 2 with metal. Alternatively, shield cases made in other ways can be used, for example, the one made of a metal plate, the one made by metal print on the inner surface of a case, and the one made by embedding a metal plate into a case.

Further, in the preferred embodiment described above, the feeding points 9A and 10A are provided as shown in FIG. 3. This invention, however, is not limited to thereto and a feeding point for the conductor board 9 can be provided somewhere around the center of the board 9 and a feeding point for the shield case 10 can be provided somewhere at the upper edge of the case 10.

Figure 8B:
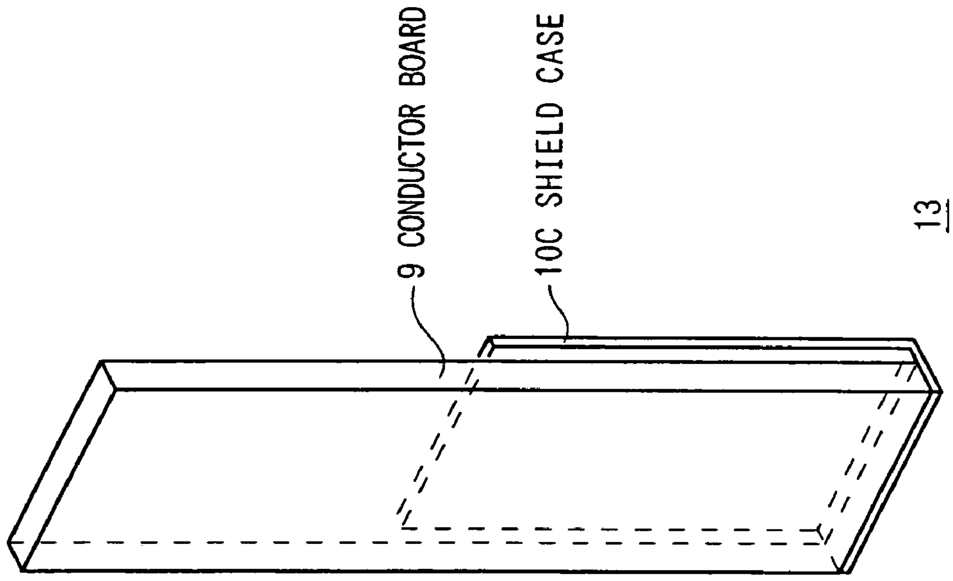
FIGS. 8A, 8B and 9 schematically show, antenna units of other embodiments.
Figure 8A:
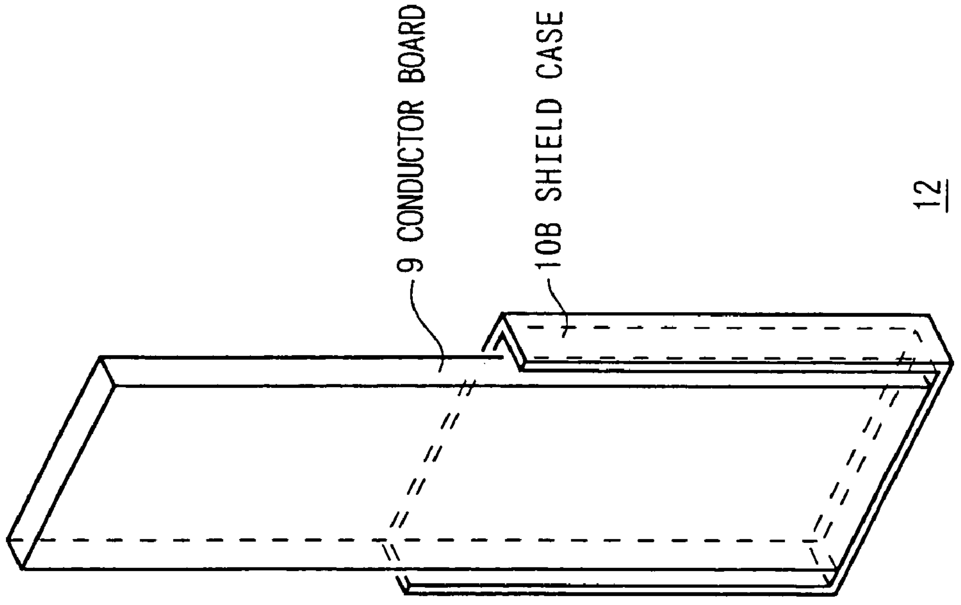

Still further, in the preferred embodiment described above, the shield case 10 as the second radiating conductor contains the entire lower half of the conductor board 9 serving as the first radiating conductor. This invention, however, is not limited to this and such antennae can be used: the one 12 made by covering only one surface and both sides of the lower half of the conductor board 9 with a shield case 10B as shown in FIG. 8A; and the one 13 made by covering only one surface of the lower half of the conductor board 9 with a shield case 10C as shown in FIG. 8B. That is, an antenna unit can be realized by arranging a second radiating conductor having about half electrical length of a first radiating conductor so as to correspond at least one surface of the first radiating conductor from its center to one end in parallel.

Figure 9:
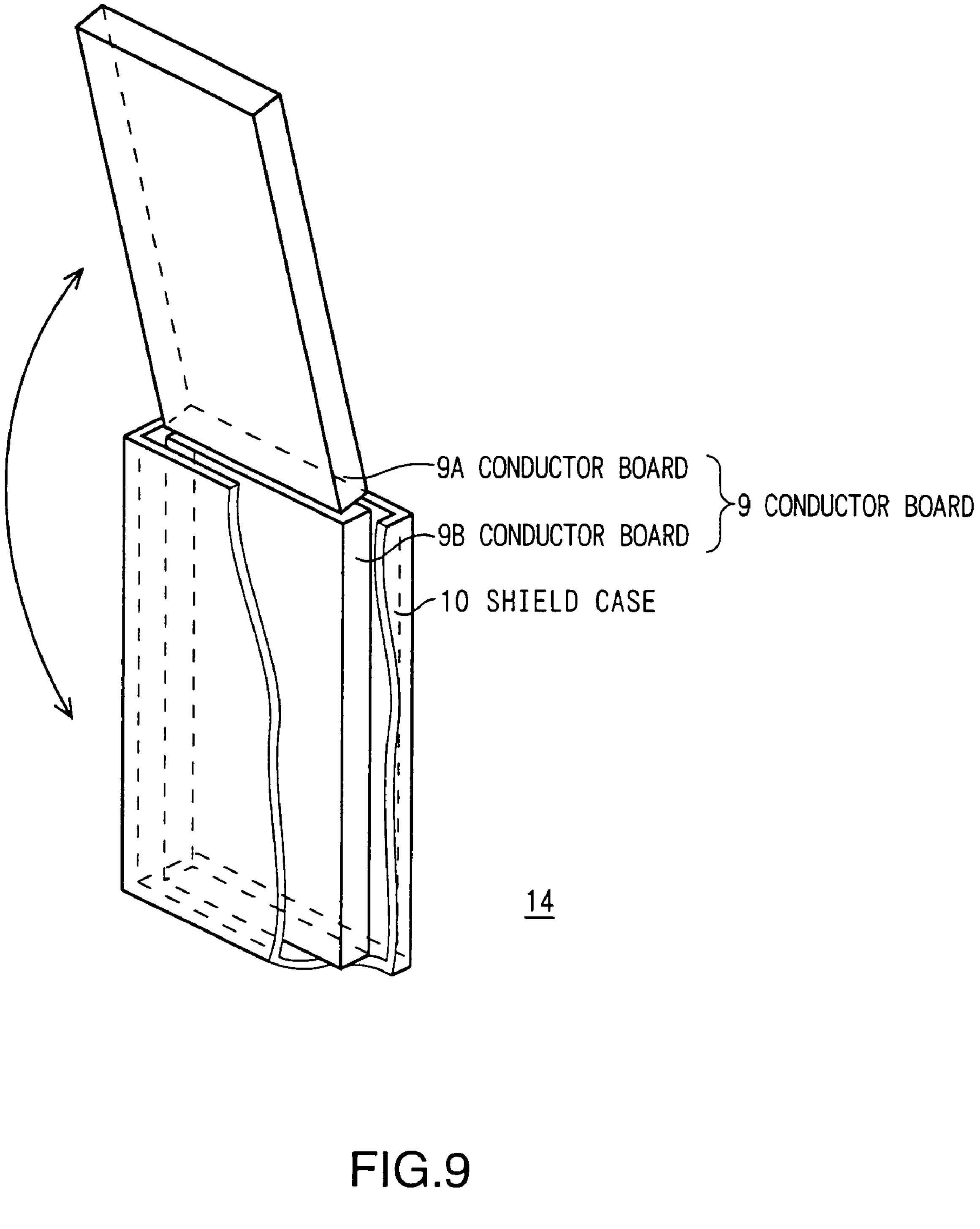

Still further, in the preferred embodiment, this invention is applied to a stick portable telephone. This invention, however, is not limited to this and can be applied to clamshell portable telephones. In this case, like an antenna unit 14 of FIG. 9, a conduct board 9 is composed of a conductor board 9A built in a display case and a conductor board 9B built in a keypad case, the conductor boards 9A and 9B being electrically connected to each other.

Still further, in the preferred embodiment, the present invention is applied to a portable telephone. This invention is not limited to this and can be applied to various portable wireless apparatuses such as personal handy phone systems (PHS).

While there has been described in connection with the preferred embodiments of the invention, it will be obvious to those skilled in the art that various changes and modifications may be aimed, therefore to cover in the appended claims all such changes and modifications as fall within the true spirit and scope of the invention.

What is claimed is:

1. A portable wireless apparatus, comprising:

a conductor board including at least a circuit board;

a box-shaped shield member having at least five sides, said box-shaped shield member having an electrical length about half that of said conductor board, and having an opening at a top thereof to receive said conductor board therein so that said box-shaped shield member has an inside surface that faces a surface of said conductor board and a bottom of said conductor board is electrically connected to a bottom of said box-shaped shield member; and a feeding mechanism configured to supply power to around a center of said conductor board and at the top of said box-shaped shield member.

2. The portable wireless apparatus according to claim 1, wherein:

the electrical length of said box-shaped shield member corresponds to about a quarter wavelength of a radio wave transmitted by said portable wireless apparatus.

3. The portable wireless apparatus according to claim 2, wherein:

said box-shaped shield member comprises a metal coating on an inside of a housing of said portable wireless apparatus.

* * * * *